United States Patent Office 2,932,631
Patented Apr. 12, 1960

2,932,631
POLYMERIZATION OF β-PINENE

Alfred L. Rummelsburg, Chadds Ford, Pa., assignor to Hercules Powder Company, Wilmington, Del., a corporation of Delaware No Drawing. Application December 26, 1957
Serial No. 705,131

3 Claims. (Cl. 260—93.3)

This invention relates to the polymerization of β-pinene and more particularly to the production of hard resins from polymerization treatment of a mixture of α- and β-pinene.

It is well known that β-pinene can be polymerized to hard resins by contacting β-pinene with a Friedel-Crafts catalyst, and that when α-pinene is present, it polymerized to a balsam and greatly softens the resin product. When the pinene cut contains more than about 25% α-pinene, the resins are very soft due to the homopolymerization of the α-pinene. The prior art catalysts, including the Friedel-Crafts catalysts, are low in selectivity and polymerize other terpenes including α-pinene in pinene cuts containing the β-pinene so that hard resins are obtained only when pinene cuts used contain at least about 75% β-pinene.

Now in accordance with the present invention it has been found that β-pinene is polymerized to a much higher melting resin when the β-pinene is contacted with a catalytic amount of an organoaluminum chloride of the formula $RAlCl_2$ in which R is a hydrocarbon radical. It has further been found that β-pinene may be polymerized even in the presence of up to about 80% α-pinene with the production of a hard, stable, light-colored resin.

The polymerization process of the present invention is highly selective with respect to polymerization of β-pinene. When the process is applied to a β-pinene cut containing also α-pinene, the first β-pinene polymerizes as a homopolymer, but as the polymerization proceeds and the ratio of available β-pinene becomes less, the β-pinene forms a copolymer with α-pinene which is softer than the β-pinene homopolymer. However, when the β-pinene has all polymerized, the α-pinene remaining in contact with the catalysts of this invention is greatly resistant to homopolymerization, and it is possible to stop the polymerization process by destruction of the catalyst and prevent formation of the balsamic α-pinene polymer. The ratio of β-pinene homopolymer to β-pinene copolymer in a resin obtained by contacting a mixture of β-pinene and α-pinene with the catalyst of this invention is highest in the first increments of polymer formed and decreases as the ratio of β-pinene to α-pinene changes during the polymerization process. The highest melting resins are thus obtained from those pinene mixtures in which the β-pinene content is greatest, but high melting resins may also be obtained by stopping the polymerization before all of the β-pinene has polymerized and before a substantial amount of copolymer is produced. Using catalysts of the present invention, the polymerization of β-pinene to hard high melting resins is possible even with as much as about 80% α-pinene present in the pinene cut of β-pinene.

The reaction may be carried out in the presence or absence of an inert hydrocarbon solvent or halogenated hydrocarbon solvent to act as a diluent for the reaction, in which case the catalyst may be dissolved in the solvent, and the catalyst solution and the pinene may then be combined.

The polymerization temperature may be any temperature in the range of about −80 to about 150° C. The preferred temperature of reaction is in the range of about 5° C. to about 65° C. The rate of polymerization increases with increase in temperature so that one skilled in the art may select a temperature that gives the desired polymer in any selected time interval.

The $RAlCl_2$ catalyst is generally prepared by the reaction of a halogen substituted hydrocarbon with metallic aluminum but may be prepared by any of the well known methods known in the art. While the nature of the hydrocarbon radical is not critical, it may be any aryl, alkyl, or cycloalkyl hydrocarbon radical having up to about 18 carbon atoms. However, it is preferably a lower alkyl, with 1 to 4 carbon atoms. Examples of operable hydrocarbon radicals are: methyl, ethyl, propyl, butyl, cyclopentyl, cyclopentadienyl, cyclohexyl, phenyl, and tolyl. The amount of catalyst likewise is not critical and while an excess over a catalytic amount may be used, a catalytic amount and less than about 10% is generally used. The catalyst need not be free of impurities to be effective in the process of this invention and may contain in addition $R_2AlCl$ or $AlR_3$ or other by-products which may be present.

The process of this invention is more explicitly described by the following examples in which the parts are parts by weight.

Examples

In the table are set forth details of various runs to show the types of products obtainable by variations within the scope of this invention. In general, the polymerizations were carried out by adding the β-pinene to the catalyst mixture but in runs 5–9 the catalyst mixture was added to the β-pinene mixture. Runs 1 and 2 show the use of catalyst containing $C_2H_5AlCl_2$ produced by the reaction of $(C_2H_5)_2AlCl$ with $TiCl_4$, neither of which reagents alone are effective catalysts. Runs 3–7 on the other hand show the use of $C_2H_5AlCl_2$ alone as the catalyst, runs 4 and 8 being blanks to distinguish polymerization of α-pinene from the polymerization of β-pinene alone as well as in a mixture. Runs 9–16 show the use of $(C_2H_5)_2AlCl$ in admixture with $C_2H_5AlCl_2$ which mixture is usually called an aluminum sesquichloride as though it were a distinct compound rather than a mixture.

| Run | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| β-Pinene | 50 | 50 | 55 | | 50 | 50 | 50 | | 50 | 55 | 23.5 | 55 | 55 | 55 | 55 | 50 |
| α-Pinene | | | | 55 | 375 | 380 | 50 | 80 | 380 | | 23.5 | | | | | 335 |
| Toluene | 400 | 400 | | | | | | | | | | | | | | |
| Heptane | | | 380 | 380 | | | 340 | | | 380 | 380 | 380 | 380 | 380 | 380 | |
| Catalyst Mixture: | | | | | | | | | | | | | | | | |
| $(C_2H_5)_2AlCl$ | 1.1 | 1.1 | | | | | | | 2.0 | 1.5 | 1.1 | 1.05 | 1.05 | 1.05 | 1.35 | 2.0 |
| $TiCl_4$ | .85 | .85 | | | | | | | | | | | | | | |
| $C_2H_5AlCl_2$ | | | 1.47 | 1.47 | 2.0 | 2.0 | 2.0 | 1.6 | 2.0 | 1.5 | 1.1 | 1.05 | 1.05 | 1.05 | 1.35 | 2.0 |
| Toluene | 21 | 21 | | | | | | | | | | | | | | |
| Heptane | | | 5.9 | 5.9 | 8 | 8 | 8 | 8 | 27 | 19.8 | 15 | 14 | 14 | 14 | 18 | 27 |
| Temp., °C | 45 | 27 | 45 | 45 | 45–80 | 10–47 | 10–47 | 10–47 | 10–36 | 24–28 | 35–40 | 35–40 | 0 | −67 to −74 | −67 to −74 | 10–49 |
| Time, Hr | 2.25 | 2.3 | 2.5 | 2.5 | 2 | 2 | 2 | 2 | 1.5 | 6 | 2.5 | 2.5 | 2.5 | 4 | 3 | 2 |
| Resin Yield | 50 | 42 | 51 | 2 | 75 | 75 | 53 | 7 | 58 | 54 | 21 | 53 | 51 | 4 | 4 | 58 |
| M.P., °C (Capillary) | 113–120 | 108–114 | | | | | | | | | | | | | | |
| S.P., °C (Drop Method) | | | 145 | (²) | 102 | 110 | 141 | (²) | 121 | 134 | 109 | 135 | 131 | (¹) | (¹) | 121 |

¹ Pale brittle resins.   ² Balsamic resins.

Runs 14 and 15 show that pale hard resins are also obtainable at temperatures as low as −74° C.

The polymerizations are all slightly exothermic and are carried out by any of the procedures known in the art for polymerization of β-pinene simply by substitution of the catalyst of this invention for the prior art catalyst, and by use of anhydrous reagents in an anhydrous system such as is normally used with water sensitive catalysts such as aluminum chloride. In addition, oxygen, carbon dioxide, and compounds with an active hydrogen such as are known to react with metal alkyls are kept out of the polymerization system. In general, the catalysts of this invention give a paler and harder product than is given by aluminum chloride under the same reaction conditions using equivalent quantities of catalyst even with pure β-pinene. Moreover, the $C_2H_5AlCl_2$ acts more selectively on β-pinene in a mixture with α-pinene than does aluminum chloride, or other Friedel-Crafts catalyst of the prior art and as a result pinene of lower β-pinene content may be subjected to the polymerization reaction using $C_2H_5AlCl_2$ for the production of a hard resin. When α-pinene is present, the reaction time is selected as a time sufficient for β-pinene contained therein to polymerize and a longer time which might force slow polymerization of α-pinene is avoided. Timing is a variable readily determined by a preliminary run.

The catalyst is inactivated at the end of the selected polymerization period for production of the desired resin by reaction with a hydroxyl compound such as water, alcohol or a carboxylic acid. For this purpose, water, methanol, ethanol, formic acid or acetic acid in an amount at least equal molecularly to the amount of catalyst and preferably at least three times the molecular amount may be used. The catalyst is then washed out with an aqueous alkali (preferably NaOH) solution and the resin is recovered from the organic layer by distilling off the unreacted pinene and other solvents that may be present. This distillation may be a dry distillation or a steam distillation and is preferably carried out under reduced pressure.

While the examples show the preferred catalyst $RAlCl_2$, in which R is the ethyl radical, other homologs thereof are equally useful but are less readily available and in chemically equivalent amounts are equivalent and may be substituted directly for $C_2H_5AlCl_2$.

The resins of this invention find utility in lacquer compositions and as a gum substitute in varnishes the same as β-pinene polymers of the art.

What I claim and desire to protect by Letters Patent is:

1. The method of preparing a hard, stable, light-colored resin which comprises contacting β-pinene with a catalytic amount of $RAlCl_2$ in which R is a hydrocarbon radical selected from the group consisting of the lower alkyl radicals having 1 to 4 carbon atoms at a temperature in the range of about −80 to about 150° C. until polymerization of β-pinene is effected and separating said resin by distilling off the unreacted pinene.

2. The method of claim 1 wherein $C_2H_5AlCl_2$ is used as the active catalyst component.

3. The method of preparing a hard, stable, light-colored resin which comprises contacting a mixture of alpha- and beta-pinene containing at least 20% β-pinene with a catalytic amount of $RAlCl_2$ in which R is a hydrocarbon radical selected from the group consisting of the lower alkyl radicals having 1 to 4 carbon atoms at a temperature in the range of about −80 to about 150° C. until polymerization of β-pinene is effected, deactivating the catalyst before all of the β-pinene has polymerized, and separating said resin by distilling off the unreacted pinene.

References Cited in the file of this patent

UNITED STATES PATENTS

| | | |
|---|---|---|
| 2,388,428 | Mavity | Nov. 6, 1945 |
| 2,405,558 | Borglin | Aug. 13, 1946 |
| 2,794,819 | Smith | June 4, 1957 |
| 2,848,472 | Cottle | Aug. 19, 1958 |
| 2,852,544 | Nowlin et al. | Sept. 16, 1958 |

FOREIGN PATENTS

| | | |
|---|---|---|
| 538,782 | Belgium | Dec. 6, 1955 |